(12) United States Patent
Bushee

(10) Patent No.: US 9,030,085 B2
(45) Date of Patent: May 12, 2015

(54) COMPACT LIGHTING SYSTEM

(71) Applicant: Glenn Bushee, Duxbury, MA (US)

(72) Inventor: Glenn Bushee, Duxbury, MA (US)

( * ) Notice: Subject to any disclaimer, the term of this patent is extended or adjusted under 35 U.S.C. 154(b) by 150 days.

(21) Appl. No.: 13/841,587

(22) Filed: Mar. 15, 2013

(65) Prior Publication Data
US 2013/0201672 A1    Aug. 8, 2013

Related U.S. Application Data

(63) Continuation-in-part of application No. 13/395,612, filed as application No. PCT/US2011/025668 on Feb. 22, 2011.

(60) Provisional application No. 61/339,232, filed on Mar. 2, 2010.

(51) Int. Cl.
| | | |
|---|---|---|
| F21V 15/04 | (2006.01) | |
| A45F 5/02 | (2006.01) | |
| A43B 3/00 | (2006.01) | |
| A45C 15/06 | (2006.01) | |
| B60Q 1/26 | (2006.01) | |
| F21V 33/00 | (2006.01) | |
| F21V 15/00 | (2006.01) | |
| G08B 5/00 | (2006.01) | |
| F41G 1/34 | (2006.01) | |
| A01K 85/01 | (2006.01) | |
| A01K 91/06 | (2006.01) | |
| A45F 3/04 | (2006.01) | |
| F21V 31/00 | (2006.01) | |
| F21V 17/10 | (2006.01) | |
| F21V 21/08 | (2006.01) | |
| F21Y 101/02 | (2006.01) | |

(52) U.S. Cl.
CPC . *F21V 15/04* (2013.01); *A45F 5/02* (2013.01); *A43B 3/001* (2013.01); *A45C 15/06* (2013.01); *A45F 3/04* (2013.01); *B60Q 1/2673* (2013.01); *F21V 31/00* (2013.01); *F21V 33/00* (2013.01); *F21V 33/0008* (2013.01); *F21V 33/008* (2013.01); *F21V 15/00* (2013.01); *F21V 17/101* (2013.01); *F21V 21/08* (2013.01); *G08B 5/004* (2013.01); *F21Y 2101/02* (2013.01); *F41G 1/34* (2013.01); *A01K 85/01* (2013.01); *A01K 91/06* (2013.01)

(58) Field of Classification Search
CPC .............................. F21V 15/04; F21V 33/0008
USPC ...................................... 362/190, 390, 296.01
See application file for complete search history.

(56) References Cited

U.S. PATENT DOCUMENTS

2007/0291473 A1* 12/2007 Traynor ......................... 362/106
2010/0039243 A1*  2/2010 Tuan ............................. 340/326

* cited by examiner

Primary Examiner — Elmito Breval
(74) Attorney, Agent, or Firm — Lawrence J. Shurupoff

(57) ABSTRACT

A layered lighting assembly includes a circuit board having a battery, a light, a switching circuit and a push button switch selectively powering the light with the battery via the switching circuit. The circuit board is protected from vibration and impact with a relatively soft compressible foam layer provided adjacent the circuit board. A semi-rigid protective sheet of flexible plastic is layered over or layered adjacent to the circuit board to resist bending and flexing of the circuit board and thereby further protect the circuitry.

17 Claims, 8 Drawing Sheets

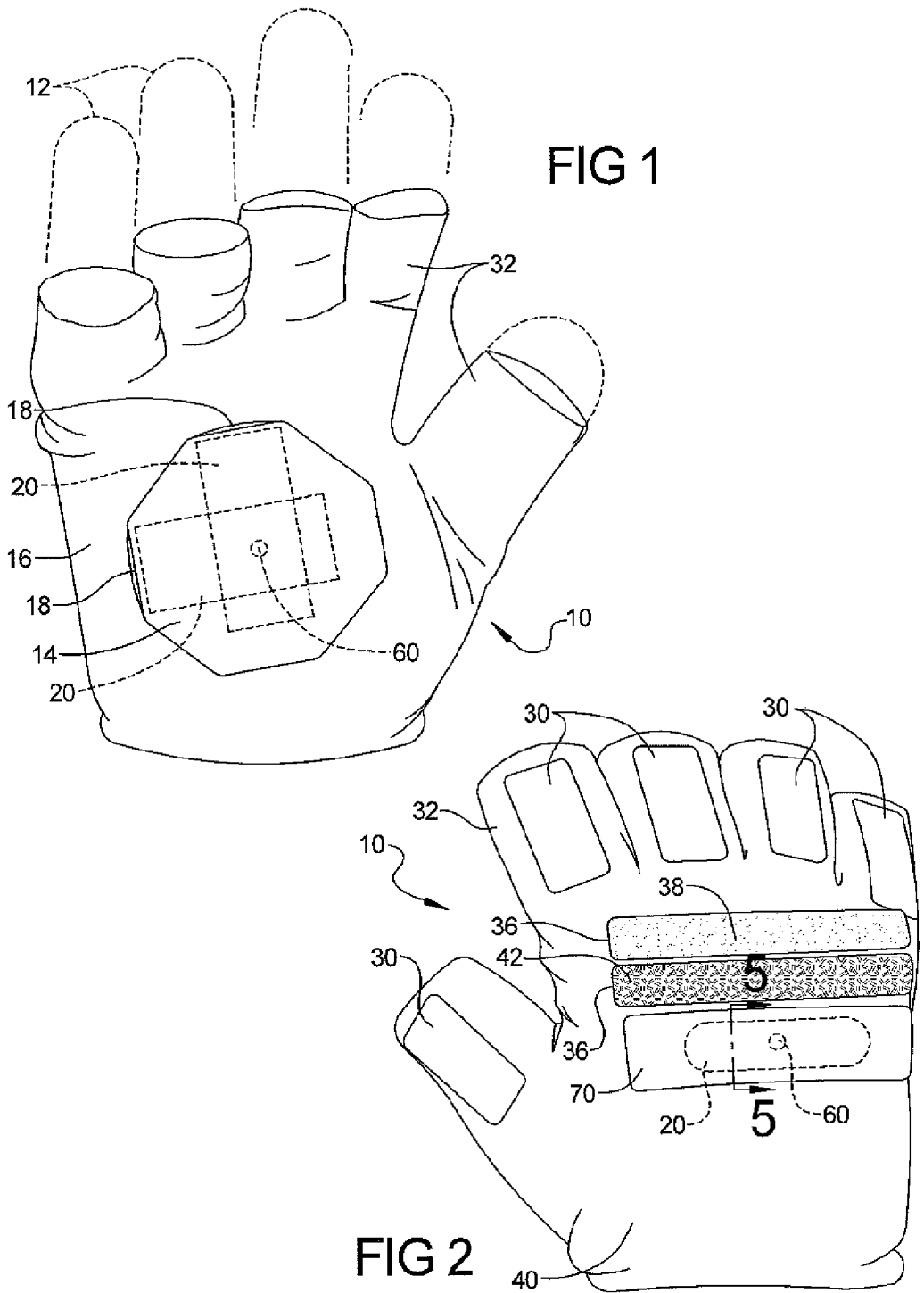

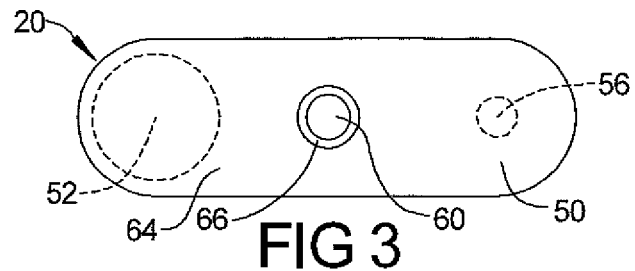
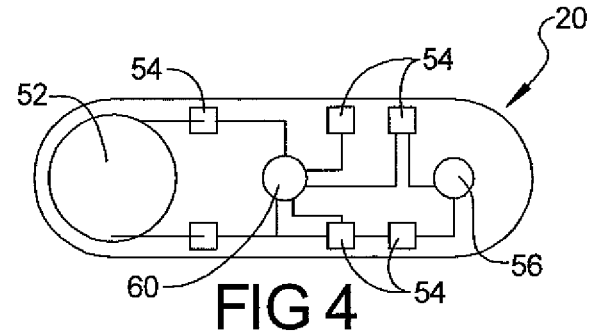
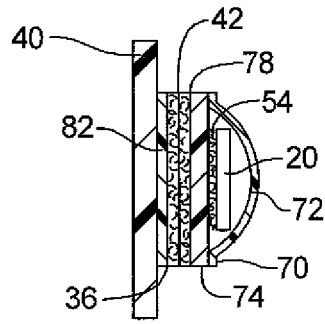
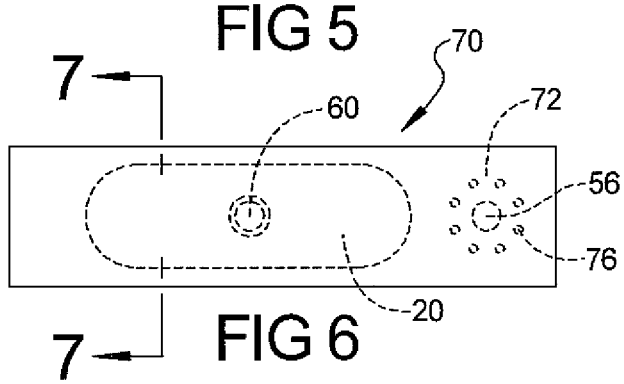
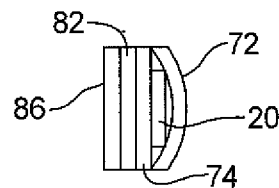

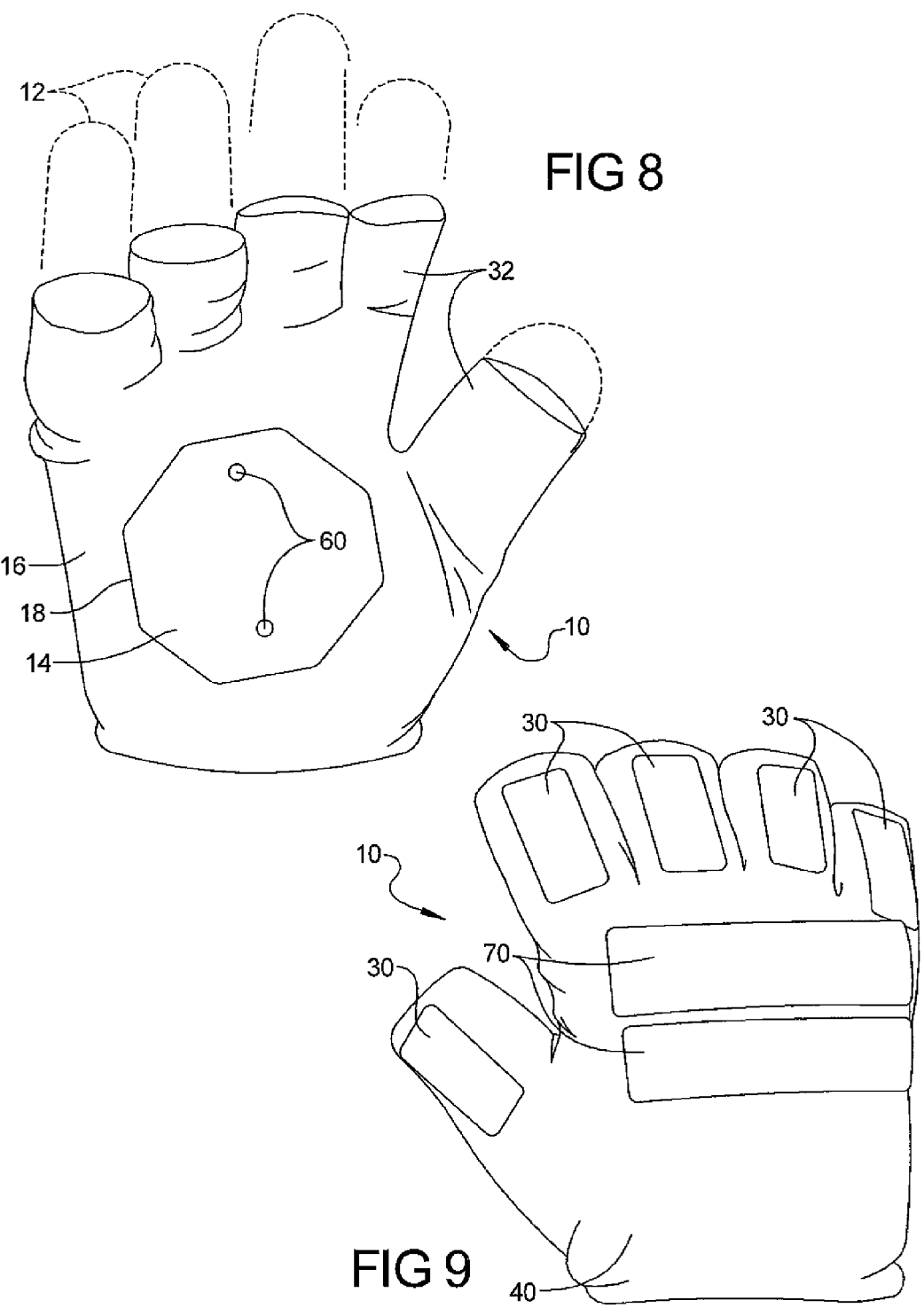

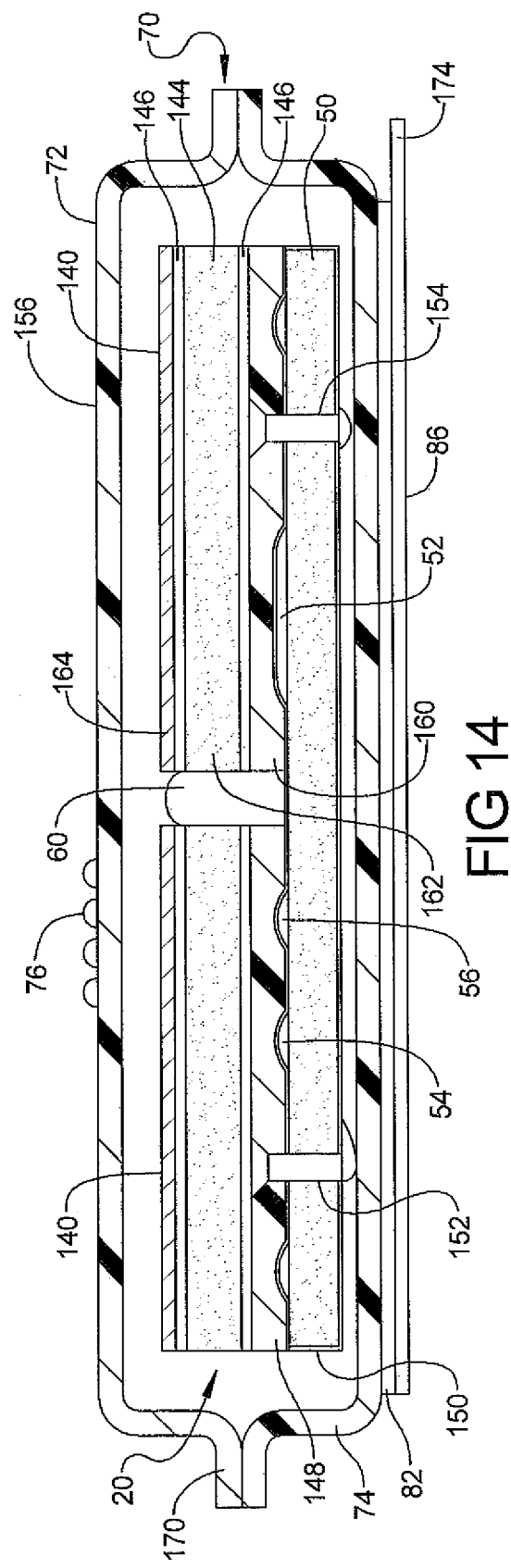

//COMPACT LIGHTING SYSTEM

CROSS REFERENCE TO RELATED APPLICATIONS

This application claims the benefit and priority of U.S. application Ser. No. 13/395,612 entitled "Compact Lighting System" filed Mar. 12, 2012 which claimed priority to PCT application number PCT/US11/25668 entitled "Compact Lighting System" filed Feb. 22, 2011 which claimed priority to U.S. provisional application No. 61/339,232 entitled "Illuminated Safety Glove" filed Mar. 2, 2010. Each of the applications identified above are incorporated herein in their entirety by reference.

BACKGROUND AND SUMMARY

A need exists for a compact, lightweight portable lighting system which is low in cost so as to allow for single use applications. A further need exists for such a lighting system that is optionally reusable and which can be selectively turned on and off to conserve battery power and extend the operating life of the lighting system.

In accordance with this disclosure, a compact lighting system has been developed which can be carried on or removably applied to a substrate such as clothing, shoes, hats, helmets, gloves, shirts, pants, belts and the like to assist in alerting others of the presence of a person located in dim or dark lighting (in the dark). The compact lighting system can also be used as a location marker to provide a light signal at a chosen location such as marking a trail or marking a specific position or building or identifying the condition of a particular location with the use of the lighting system.

For example, the compact lighting system disclosed herein can be used by military and law enforcement to indicate whether or not a room, cell, building, or a natural or man-made structure has been "cleared." One color light can indicate a "safe" condition while another color can indicate a location which has not been cleared or checked for hazards. Ultraviolet and infrared lighting can be used for tactical and military applications. Specific applications for the subject compact lighting system include an illuminated glove for directing traffic at night, illuminated helmets, safety vests, running shoes, shirts, pants, belts, or any application where the safety of an individual can be improved by a warning light. This includes use by construction workers, highway maintenance workers, joggers, cyclists, motorcyclists, airport workers, firemen, emergency responders such as ambulance workers, emergency medical technicians (EMT) and any others in proximity to traffic, construction equipment, machinery and other potential hazards.

In further accordance with this disclosure, an easy-to-operate compact lighting system is provided with a removable mounting for easy convenient use on virtually any surface. The lightweight system can be hermetically sealed in a clear or translucent pouch or covered with a waterproof coating for protection against vibration, shock, harsh environments and moisture. The outer surface of the pouch overlying an on-off light switch may be textured to allow an operator to easily locate and operate the light switch solely by feel in either the light or in the dark.

Because of the compact size of the light assembly, it can be applied to fishing line, fishing lures and other fishing tackle to attract and catch fish.

BRIEF DESCRIPTION OF THE DRAWINGS

In the drawings:

FIG. 1 is a schematic front or palm view of a glove fitted with a compact lighting assembly in accordance with one embodiment of the disclosure;

FIG. 2 is a schematic rear or back hand view of FIG. 1;

FIG. 3 is a front view of an integral battery, light and switch circuit assembly;

FIG. 4 is a rear view of FIG. 3;

FIG. 5 is a view in a section taken along section line 5-5 of the assembly of FIG. 2 fitted within a removable easing;

FIG. 6 is a front view of an integral battery, light and switching assembly fitted within a removable mounting strip;

FIG. 7 is a view in cross section taken through section line 7-7 of FIG. 6 and showing a complementary adhesive mounting strip;

FIGS. 8 and 9 are perspective front and rear views of a glove as represented in FIGS. 1 and 2 with lighting assemblies removably secured to the glove;

FIG. 14 is an enlarged cross sectional view of a compact lighting assembly enclosed in a protective pouch;

In the various views of the drawings, like reference numerals designate like or similar parts.

DESCRIPTION OF REPRESENTATIVE EMBODIMENTS

Figure 10:
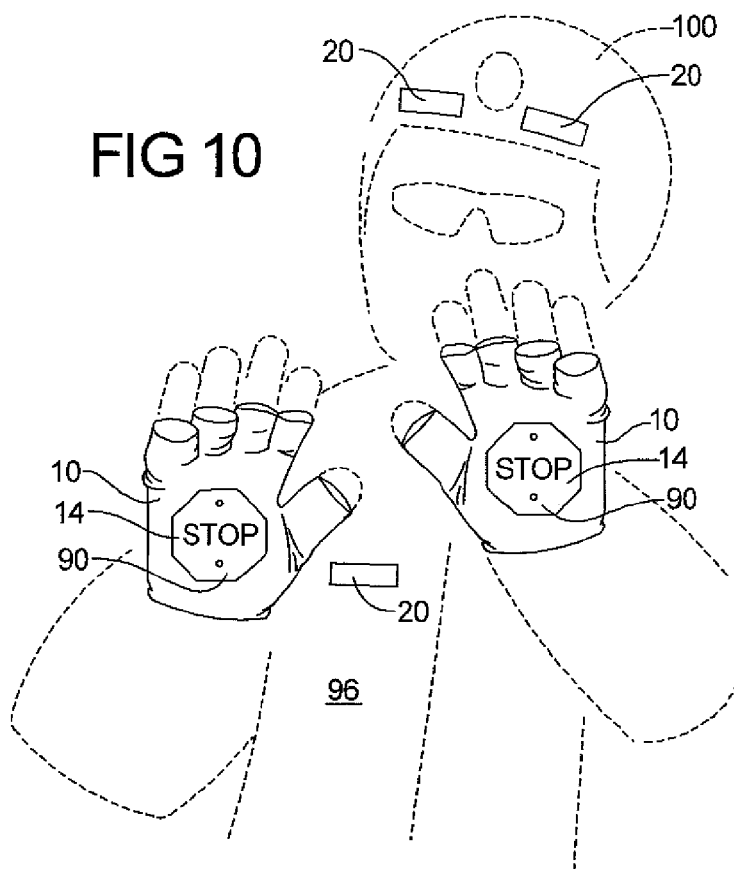
FIG. 10 is a perspective view of a representative application of the glove of FIGS. 8 and 9 and showing use of a lighting assembly such as shown in FIG. 6 applied to clothing and to a helmet.

A representative application of the subject lighting system is shown in FIG. 1, wherein, a glove 10 is formed in a known fashion of a woven or nonwoven material such as a stretchable breathable mesh material. The glove 10 can be formed with or without finger tip portions 12. A translucent and preferably light-reflective pocket 14 is sewn, bonded or otherwise mounted to the front or palm portion 16 of the glove 10. The pocket 14 can be fabricated from a light-transmitting reflective sheet of thin flexible plastic material which may be smooth surfaced or grooved, checkered or otherwise textured to enhance light diffusion. One or more openings or slits 18 are formed along the border of the pocket 14 for snugly receiving a battery, light and switch assembly 20, as discussed further below. Assembly 20 is shown in rectangular dashed lines in FIG. 1 in two different possible mounting positions (horizontal and vertical).

The back of the glove 10 is shown in FIG. 2. Strips of light-reflective plastic or metal foil material 30 are sewn, bonded or otherwise attached to the back surface of the glove fingers 32. Attachment or mounting strips or pads 36 coated on their outer surfaces with adhesive material 38 or provided with other connectors can be removably or permanently mounted to the rear surface 40 of the glove 10 such as by sewing. The tacky adhesive coating 38 allows for the removable mounting of an integral battery, light and switch assembly 20. Alternatively, strip 36 can be provided with a hook and loop fabric fastening surface 42 to receive hook and loop fasteners provided on the back of the battery, light and switch assembly 20, or on a pocket which carries assembly 20. One embodiment of a compact, lightweight battery, light and switch assembly 20 is shown in FIGS. 3 and 4. A thin, semi-flexible, laminated, shiny, mirror-like, light-reflecting substantially planar sheet 50 of plastic acts as a platform, planar base or flat circuit board for holding a thin â€ ̃ebuttonâ€ battery 52 soldered or otherwise fixed to its front or rear surface. Sheet 50 is advantageously formed of a waterproof sheet or foil to protect microcircuitry 54 carried on platform 50. The battery 52 is electrically connected to switching microcircuitry 54 which is controlled by a user-operated button switch 56. The microcircuitry 54 can be further waterproofed with a layer of epoxy and covered by a thin sheet of rigid plastic. The rigid plastic sheet can be staked to the sheet 50 with pins or rivets to increase the strength of the laminated assembly.

In another embodiment, sheet 50 is formed with a nonreflective, black or matte black surface when the lighting assemble 20 operates with an infrared light. A flat black surface coating can be applied to planar sheet 50 to improve and enhance the detection of infrared light signatures When using an infrared viewer such as night vision goggles. The sequential actuation of button switch 56 causes the microcircuitry 54 to apply power to a light-emitting diode (LED) or other miniature electric light 60 in various operating modes. For example, a first actuation or depression of button switch 56 can trigger circuitry 54 to apply full constant power to the LED 60 for a bright constant light, A second depression of button switch 56 can trigger circuitry 54 to apply less than full constant power to the LED 60 for a longer-lasting low-power lighting.

Other sequential operating modes can include a rapidly strobed or pulsed light mode, a slowly strobed or pulsed light mode, a high power strobed or blinking light mode, a low power strobed or blinking light mode and a power off mode to turn off the LED light. The button switch 56 can be mounted on either the front or rear surface of the assembly 20 and is easily depressed and actuated by pressing down on any flexible covering material overlying button switch 56 or by directly pressing button switch 56, if it is exposed. As noted above, the button switch 56 can be located on either the front or rear surface of sheet 50. This allows an operator to actuate the button switch 56 from the front or rear surface of sheet 50, depending on the application or end use of lighting assembly 20.

To maximize the visible lighting emitted from the assembly 20, the reflective front surface 64 (FIG. 3) of the sheet 50 is formed with a highly reflective mirror-like surface finish or coating. This can take the form of a thin shiny metal foil or a layer of light-reflecting paint. An aperture or port 66 (FIG. 3) is formed through sheet 50 to allow for the unobstructed passage of light from LED light 60.

As seen in FIGS. 8 and 9, lighting assembly 20 can be directly attached to the glove 10 by pressing the lighting assembly 20 against a tacky surface 38 (FIG. 2) provided on the outer surface of the glove (FIG. 2) or inserted into a translucent pocket on glove 10, such as into pocket 14 (FIGS. 1 and 8) through an opening or slit 18 communicating with the interior of pocket 14.

Another mounting method is shown in FIGS. 2, 5 and 9 where the assembly 20 is removably mounted to glove 10 with an integral adhesive layer or, as further shown, with a hook and loop releasable fabric connection. The assembly 20 can be fitted within a pouch or flexible casing 70. Pouch 70 can be hermetically sealed around the lighting assembly 20 to protect the lighting assembly 20 from shock, vibration, exposure to ambient moisture, liquids, dust and the like. The outer surface or ply 72 of casing 70 can be coated or formed of a translucent light-reflecting plastic material such as an ANSI class 2 material or simply formed of a clear sheet of plastic. This material can be used for pocket 14 (FIG. 1) as well. In the event the LED 60 becomes inoperative, surface 64 (FIG. 3) will still brightly reflect light from auto headlights, flashlights and the like to provide a secondary level of safety in those applications where visible light is provided by LED 60.

As seen in FIG. 5, the rear surface or ply 74 of casing 70 can be covered with an integral flexible hook and loop fabric material 78 of the type marketed under the brand Velcro. As further seen in FIGS. 2 and 5, an attachment strip 36 of adhesive or tacky material can be permanently or removably coupled, glued, bonded, sewn clipped or otherwise attached or coupled to a substrate such as to the glove 10 such as on the front portion 16 (FIG. 1) or on the rear surface portion 40 as shown in FIG. 5, In FIG. 5, an adhesive backing 82 is provided on a strip of Velcro material 42 and permanently or removably attached or bonded to the rear outer surface 40 of the glove 10 for removably mounting the lighting assembly 20 to the glove 10. Surface portion 40 in FIG. 5 can also represent the surface of any substrate such as a building or other structure or any article worn or carried by a person including a glove, a shoe, a vest, a shirt, a jacket, a hat, a helmet, pants, and belts. The outer surface portion 40 can also represent virtually any surface or substrate or article including articles worn by animals, such as collars, harnesses, clothing and the like.

With attachment strip 36 in place on surface 40 of glove 10, casing or pouch 70 can be quickly and easily mounted and demounted from glove 10 or any other substrate with a simple press for installation and a simple pull or peel for removal, as the hook and loop materials 78 and 42 respectively engage and disengage from each other. When the battery 52 in assembly 20 is exhausted, an operator need only remove one casing 70 with a simple pull and quickly and easily mount a fresh casing or pouch 70 onto mounting strip 36 with a simple push or press fit. The same easy mounting and demounting is afforded by the adhesive backing 82 discussed below.

It should be noted that attachment strip 36 can be permanently or removably applied to virtually any surface for receiving and holding in place a lighting assembly 20 or a lighting assembly 20 fitted in a casing or pouch 70. Once the attachment or mounting strip 36 is in place, a casing or pouch 70 with an integral lighting assembly 20 can be quickly mounted to and demounted from the attachment strip 36 and underlying substrate to which the attachment strip is applied.

As seen in FIGS. 6 and 7, a hollow hermetically-sealed and waterproof casing or pouch 70 having an adhesive backing 82 is provided with a peel-off cover 86 similar to that used on adhesive bandages of the "Band Aid" variety. Cover 86 can be removed when required and casing 70 can be adhesively mounted in the manner of an adhesive strip on virtually any surface, such as to wails, floors, articles of manufacture, trees, rocks, clothing, footwear, warning signs, police, firemen and construction helmets and other "hard hats," as well as any other substrate such as those noted above.

Figure 13:
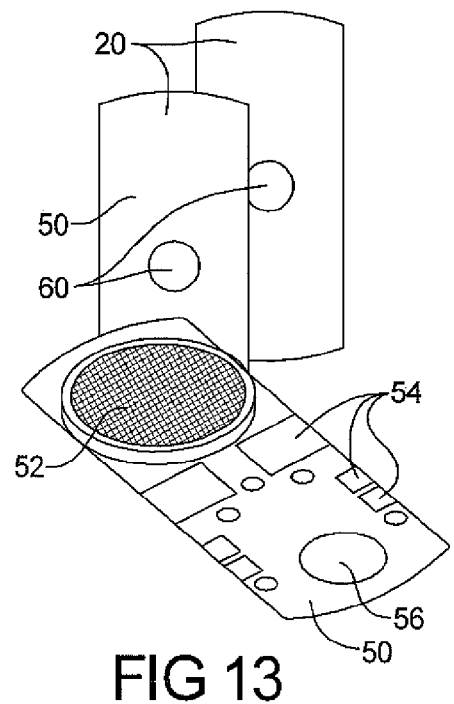
FIG. 13 is a schematic perspective view of lighting assemblies without any cover or pouch and shown approximately to scale at actual size.

In one embodiment, the length of the pouch or casing 70 is less than about two inches, i.e. about 1.75 inches (4.44 cm), the height of casing or pouch 70 is less than about one inch (2.54 cm), i.e., about 0.75 inch (1.90 cm) and the thickness through the pouch and assembly 20 as seen in FIG. 7 is less than one quarter inch, i.e., about 0.125 inch (0.317 cm). The combined weight of the pouch 70 and assembly 20 of FIGS. 6 and 7 is less than 10 grams, i.e., about 5 grams. Because of the small size and weight of this lighting assembly, a dozen or more assemblies can be conveniently carried in one's pocket to mark a trail by placing a lighting assembly 20 in at least one location or in a series of spaced-apart locations on the ground or mark other locations as desired, One simply activates the light 60 by actuating switch 56 and placing the lighting assembly on a substrate at a position or location to be marked. If provided with an adhesive hacking 82, the lighting assembly 20 can be pressed onto a desired substrate to be marked to hold the light assembly on a desired spot, such as a wall, a door, a tree, etc. Of course, one or more lighting assemblies 20 as shown in FIG. 13 need not be enclosed in a pouch 70. These simpler assemblies can be simply laid on the ground or on an object to provide a low cost lighted marker.

As further seen in FIG. 6, the portion of the outer surface of pouch 70 overlying the switch 56 can be textured such as with ridges and grooves or a series of dimples 76 to enable a user to easily locate and operate switch 56 solely by tactile feel without looking at pouch 70, This is most useful when operating lighting assembly 20 in the dark. As further seen in FIGS. 8 and 10, gloves 10 are provided with pockets 14 shaped as octagonal stop signs. The Clear translucent plastic material of each pocket 14 can be partially colored red in the manner of a stencil around the clear letters "STOP," which will clearly contrast with their surrounding red background. In this embodiment, two or more assemblies 20 can be inserted within each pocket 14 to provide increased lighting. As further seen in FIG. 10, the lighting assemblies 20 can be applied to a shirt, vest or jacket 96, and to a helmet 100.

Figure 11:
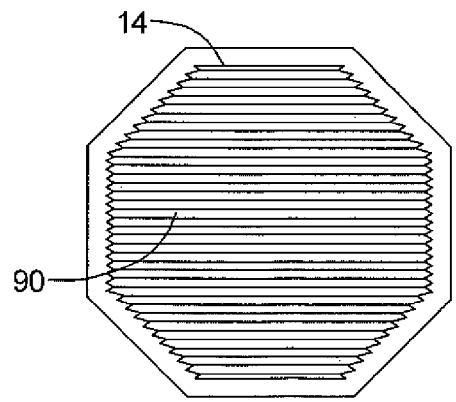
FIG. 11 is a front view of a textured translucent plastic material suitable for forming pockets or coverings over the lighting assembly of FIGS. 1 and 3.

To further enhance the visibility of the letters "STOP," the inner or outer surface of the translucent material forming each pocket 14 can be formed with a grooved and ribbed surface 90 (FIG. 11) or other textured or contoured surface to diffract and/or diffuse the light from the LED's 60. The resulting light emitted from the letters "STOP" is diffused so as to enhance or more clearly depict the letters.

Figure 12:
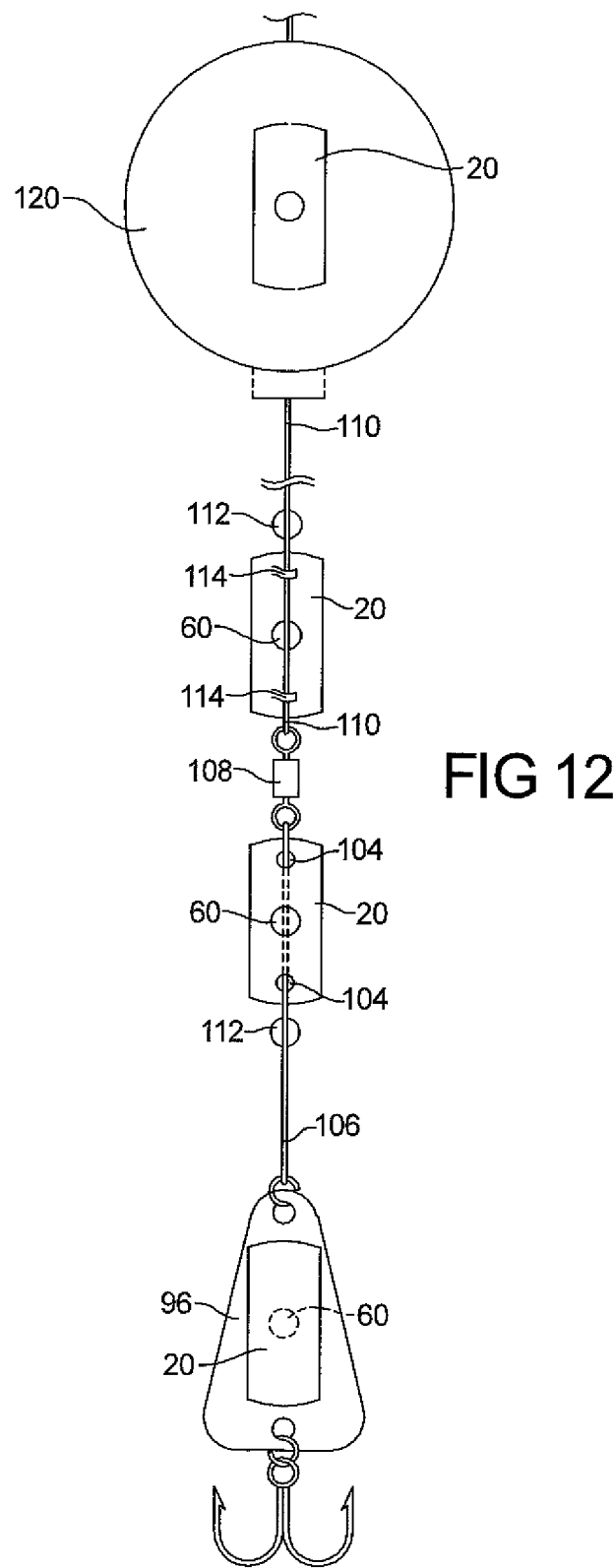
FIG. 12 is a view of a compact lighting assembly carried by a fishing lure and other fishing tackle.

Another application of the lighting assembly 20 is shown in FIG. 12, wherein the light assembly 20 is coupled to a fishing lure 96, such as with an adhesive water-resistant attachment layer such as adhesive coatings 38 and 82 noted above. Different colored LEDs 60 can be removably or permanently coupled to a fishing lure 96, or to a bobber, float, leader, line or other tackle to attract fish to the lure or bait.

The lighting assembly 20 of FIGS. 6 and 7 is well adapted for fishing applications due to its waterproof casing or pouch 70. The flashing or strobed feature of the lighting assembly is particularly useful when applied to fishing tackle or when simply dropped in the water to attract fish. In one application, a pair of light assemblies 20 can be connected to each other by pressing their adhesive backings 82 together with a fishing line or leader sandwiched between the adhesive backings 82 so as to secure the pair of light assemblies to the line or leader.

As further seen in FIG. 12, a lighting assembly 20 can be formed with mounting holes 104 allowing for a threaded connection to a fishing leader 106. A swivel 108 can be used to interconnect the leader 106 to a fishing line 110. A split shot sinker or other sinker or tackle can also be used to fix or otherwise locate the lighting assembly 20 on the leader 106 as well as to the line 110. Spring clips 114 can also be provided on the lighting assembly 20 to clip the leader 106 and/or line 110 to the lighting assembly 20. A lighting assembly 20 can also be coupled to a bobber or float 120 for further attracting fish, particularly at night, Different colored LED lights can be provided on different lighting assemblies 20 to match a particular colored light 60 to a particular fishing condition. Colors such as red, green, and white can be easily interchanged on fishing lures or other fishing tackle to find the best colored light for a particular fishing condition.

While the lighting assembly 20 described above performs well in most all environments and applications, it has been found that in some extreme environments and extremely physically demanding applications, a more rugged lighting assembly is desired. For example, in deep underwater applications and in applications where the lighting assembly 20 is subject to harsh vibrations and/or physical shocks and blows, it is desirable to provide additional protection for the circuitry 54, switch 56 and light 60. A more robust light assembly 20 can also be useful in many outdoor and sporting applications, such as boating, camping, hiking, running, hunting and fishing applications, and on dog collars and leashes, to name a few. The light assembly 20 as shown in FIG. 14 has been designed to meet these more demanding applications. It can serve as a miniature flashlight, safety warning light, signal light, light reflector and back up or emergency flashlight.

As seen in FIG. 14, a layered or laminated light assembly 20 includes a top sheet or top layer 140. Top sheet 140 can be formed of a thin sheet of highly polished metal foil, such as aluminum foil, to provide a highly light reflective outer surface portion. Top sheet 140 can have a thickness of several thousandths of an inch. This shiny outer surface portion can be used for reflecting and concentrating not only light from the LED light 60 but also external light.

For example, light from automotive headlamps can be reflected back to the light source for nighttime safety when the lighting assembly 20 is attached to or carried by a person or vehicle. This is useful for joggers, walkers, cyclists, motorcycle riders and nighttime workers. Another application for daytime use is using the reflective top sheet 140 as a signal generator for reflecting and directing sunlight to remote locations and parties, such as search parties and/or overhead aircraft or distant watercraft.

In some cases, the top sheet 140 can be formed of a dark or black light-absorbing material. One such case is when the LED light 60 is an infrared (IR) light. Alternatively, a light-reflective top sheet 140 can be covered with a layer of light absorbing material, such as a black or dark paint or coasted with a layer of light absorbing black rubber or plastic for IR applications:

The top sheet 140 overlies a protective layer 144 of shock and vibration absorbing material. Layer 144 can take the form of a sheet or strip of resilient foam material, such as high density plastic foam having a thickness of, for example, about ten to about one hundred thousandths of an inch or more. A sheet or strip of dense sponge rubber can also be used for protective layer 144. A dense nonwoven material, such as felt or a flocked fabric can also be used for layer 144. An added benefit of layer 144 is that it provides a degree of thermal insulation over an underlying circuit board to thermally protect the circuits and components on the circuit board from freezing temperatures.

The bottom of the top sheet 140 and the top of the shock-absorbing layer 144 are bonded or coupled with a layer of compliant adhesive 146. Adhesive 146 is also applied to the bottom of the vibration and shock absorbing layer 144 to bond or couple the layer 144 to the top of an underlying layer of a semi-rigid strip or sheet 148 of protective reinforcing material. Sheet 148 can take the form of a thin flexible sheet of plastic material such as a phenolic plastic material. Sheet or layer 148 can have a thickness of, for example, about ten to about thirty thousandths of an inch or more. The sheet or layer 148 can be assembled as two individual juxtaposed sheets on opposite sides of the light 60 as shown in FIG. 14 and separated by a small spacing to facilitate flexing and bending of the light assembly 20. When fully assembled, the light assembly 20 can flex up to an included angle of about 30 degrees around a hinge portion defined between the two sheets 148. This flexing helps to protect the light assemble from breakage due to moderate flexing and bending.

A platform or circuit board 50 underlies the protective strengthening sheet 148. Circuit board 50 includes the same components and microcircuitry 54 discussed above, as well as the same battery 52, LED light 60 and button switch 56. The circuit board 50 can be formed from a sheet of plastic, cardboard, fiberboard, paperboard or similar materials. Fiberboard has been found to function well due to its relative rigidity and ability to flex without cracking or breaking.

The circuit board 50 is covered, coated or encapsulated with a thin layer of adhesive or epoxy 150 to protect the microcircuitry 54 and other electrical components on the circuit board 50 from damage due to moisture, water, harmful gasses and particulates. In one example, the entire circuit board 50 and all its electrical components are coated with a thin clear layer of polyester resin epoxy. This provides waterproofing for the lighting assembly at a depth of six feet for at least thirty minutes without the use of any additional waterproofing covering. Before the epoxy coating layer on the circuit board 50 dries, the reinforcing sheet 148 can be layered over the circuit board 50 and fasteners such as stakes 152 or rivets 154 are driven through the top of the reinforcing layer 148, through the circuit board 50 and pinned to the bottom of the circuit board 50. This securely couples the reinforcing sheet 148 to the circuit board 50.

The subassembly of the reinforcing sheet 148 and circuit board 50 can be coupled or bonded to the upper layers of the light assembly 20 by pressing together the top surface of the reinforcing sheet 148 and the epoxy coated bottom surface of the shock and vibration absorbing layer 144. With the shock and vibration absorbing layer 144 bonded to the top sheet 140, the layered lighting assembly 20 is complete.

It has been found that this reinforced and shock and vibration protected embodiment of the lighting assembly 20 can perform well in most all harsh environments. While the laminated or layered construction is surprisingly strong, it is nevertheless somewhat flexible and resilient so as to resist cracking and breaking when struck or flexed. It can easily withstand all the forces and pressures applied during the repetitive actuations of the button switch 56 as the LED light 60 is turned on and off or cycled through its various operating modes.

As further seen in FIG. 14, the protective reinforcing layer 148, shock and vibration absorbing layer 144 and top layer 140 are each respectively formed with an aperture 160, 162, 164 allowing for the passage of light directed therethrough by the LED light 60. LED 60 can be recessed below, flush with or protrude from the top layer 140. It should be noted that the adhesive layers 144 and 146 contact and surround the outside surface of the LED light 60 so as to form a water moisture, gas and particulate barrier therebetween. In one embodiment the light 60 passes through the protective layer 148 and resilient shock absorbing layer 144 and optionally trough the top layer 140.

To provide even more protection to the light assembly 20, a protective casing or pouch 70 can be provided around the light assembly 20 as further shown in FIG. 14. Casing 70 can be formed with a top layer 72 of clear polyvinylchloride (PVC) plastic and a bottom layer 74 of clear or dark or black PVC plastic material. The top and bottom layers 72, 74 are hermetically sealed or bonded completely along their peripheries 170 by adhesives and/or ultrasonic welding providing waterproof protection at depths up to 200 feet or more.

Casing 70 can be provided with a tacky but releaseable adhesive layer 82 which allows the casing 70 to be adhesively coupled to a first substrate, removed and adhesively coupled to a second, third and more different substrates or on and off the same substrate up to 50 times or more. The adhesives layer 82 is covered with a peel off tab 174. This arrangement is similar to that discussed above and operates in a similar fashion.

Tactile ridges or dimples 76 can be formed or provided on the top layer 72 of the casing 70 and aligned over the underlying button switch 56. The ridges or dimples 76 and/or the area around the ridges or dimples can be color coded to identify to a user the color of the light (or no color in the case of an IR or infrared light). For example, a red color on the casing 70 indicates a red LED light, an amber color indicates an amber LED light, a white color indicates a white LED light and a green color indicates a green LED light.

The ability to attach the light assembly 20 to virtually any substrate need not be dependent on the use of a casing 70. That is, the adhesive layer 82 and cover 86 can be applied directly to the bottom of the circuit board 50 when the light assembly 20 is used without the casing 70.

In some cases, it may be desirable to permanently attach the light assembly 20 to a substrate, such as to an article of clothing, athletic shoes, backpacks, sport clothing and safety clothing as well as many other articles. In these cases, the light assembly 20 can be directly permanently adhesively bonded to a substrate, sewn in place or attached with mechanical fasteners, such as staples and rivets. Alternatively, the entire light assembly 20 can be permanently held in place with an overlying permanent light-transmitting cover which is permanently attached or fixed to an underlying substrate with sewing, bonding, fasteners or other permanent attachment methods. In this manner, the light assembly 20 is permanently held in a pocket between the substrate and cover. Of course, an open pocket or cover can be provided on any substrate or article to allow the lighting assembly 20 to be removably and replaceably carried within the pocket on a substrate.

It can be appreciated that there are virtually endless applications for the light assembly 20 disclosed above. The light assembly 20 can be carried in one's pocket or pack as a compact emergency flashlight, as a nighttime signaling or safety warning light, or as a daytime signal mirror for reflecting sunlight from the mirror-like shiny top foil layer, or when provided with a red light, as a reading light for nighttime map reading without affecting one's night vision.

Figure 15:
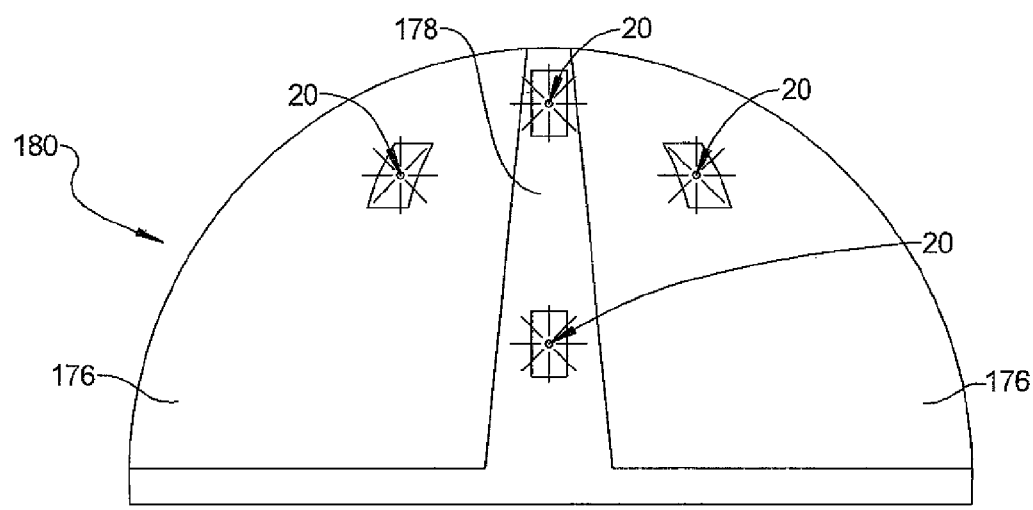
FIG. 15 is a schematic front elevation view of a tent provided with illumination by several compact lighting assemblies.

The light assembly 20 can be quickly and easily adhesively applied to one substrate, removed from the substrate and applied to a different substrate up to about fifty times. Particularly useful applications include use on the inside or outside of outdoor tents. As seen in FIG. 15, one or more light assemblies 20 can be removably or permanently attached to the exterior 176 of a tent 180 as a nighttime safety or signal light or to the interior 178 of a tent as a roof or wall light.

Figure 16:
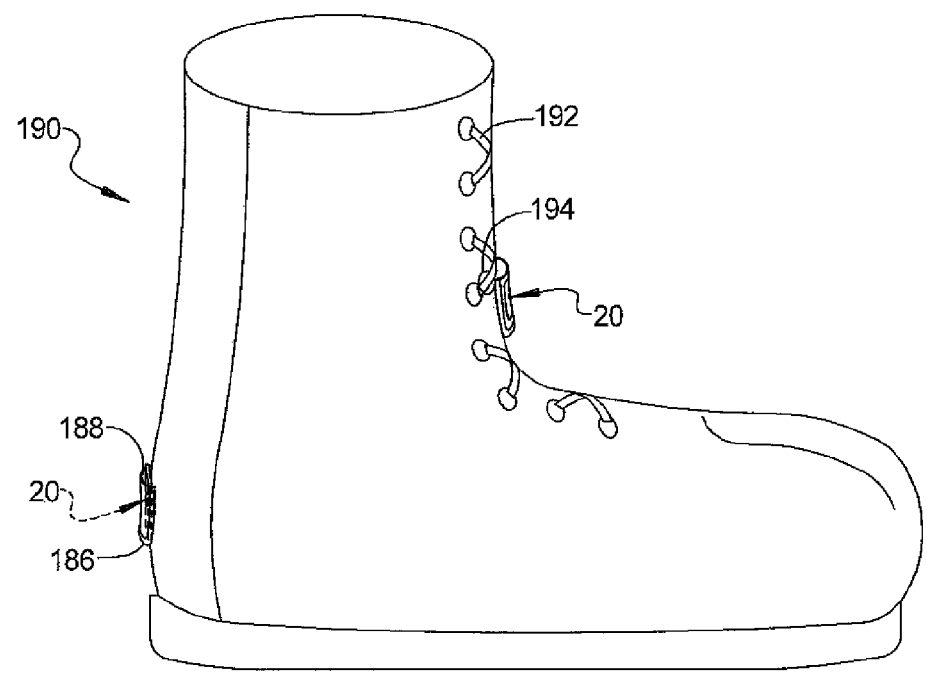
FIG. 16 is a schematic view of a shoe or boot provided with compact lighting assemblies.
Figure 17:
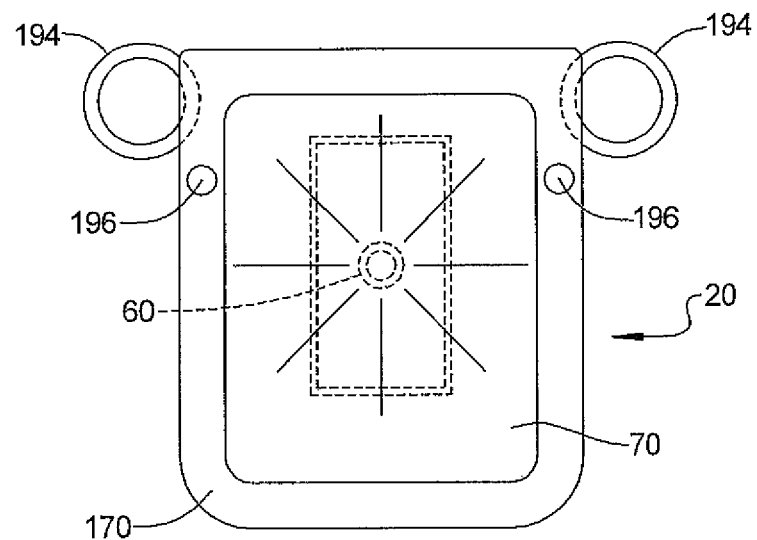
FIG. 17 is an enlarged view of a compact lighting assembly adapted for use with the shoe or boot of FIG. 15.

In FIG. 16, a light assembly 20, is removably inserted and removably held in an open pocket 186 having an opening 188 on a rear portion of a shoe or boot 190 for easy insertion and removal of the light assembly 20. Pocket 186 can include a "zip top" closure, for additional protection, if desired. The pocket 186 can be a sheet of clear plastic or an open mesh material. As shown in FIGS. 16 and 17, a light assembly 20 can also be removably held on the front portion of a shoe or boot 190 with a removable connector, such as with the laces 192 of the shoe or boot 190 passing through loops 194 or holes 196 provided on the periphery 170 of a casing 70. Mechanical clips can also serve the function of a removable connection, as can a luggage tag holder with a snap chain connector or a simple open top mesh pouch.

The removability allows the light assembly 20 to be detached from a substrate such as a boot, shoe or other footwear and used as a nighttime emergency flashlight or as a signaling device in the night or in daylight. This can be extremely useful for use with footwear worn in extreme environments where the need to signal for help is more likely. For example, use of the light assembly 20 on rock climbing shoes or on snowshoes provides an auxiliary safety and signaling device if required. The light assembly 20 can be held to the footwear with laces, clips or a perforated tear-away pouch.

Figure 18:
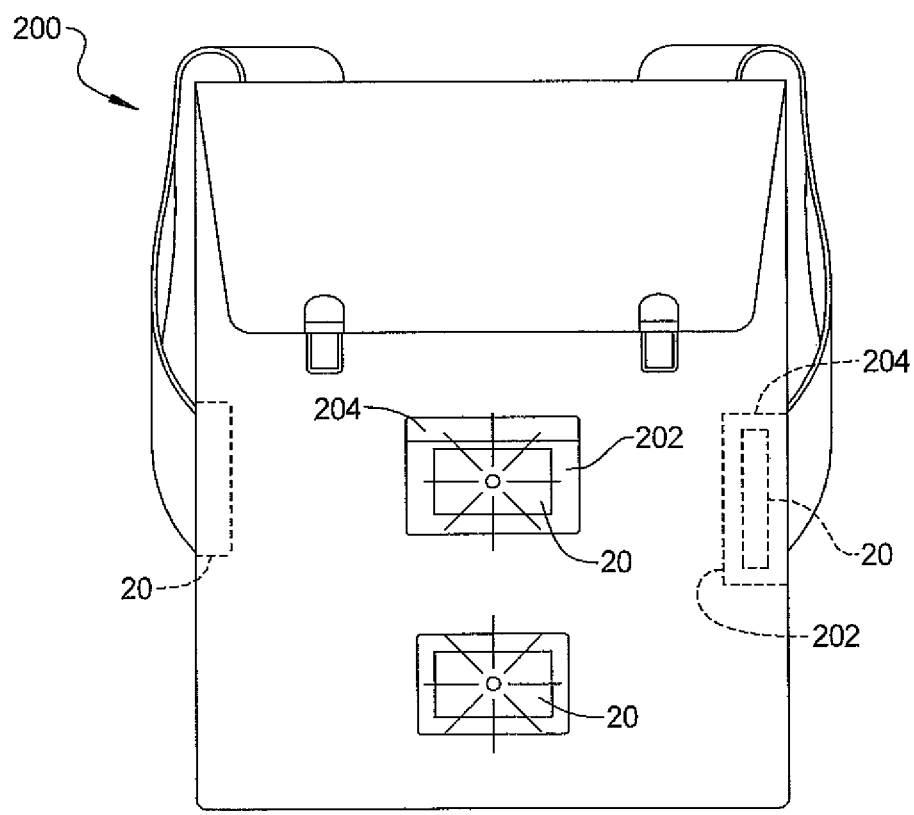
FIG. 18 is a rear elevation view of a backpack provided with interior and exterior compact lighting assemblies.

As shown in FIG. 18, a backpack 200 is equipped with one or more light assemblies 20. A light assembly 20 can be provided on the inside and/or outside of pack 20 with a simple removable adhesive connection, as described above. Alternatively, a pocket 202 of light transmitting plastic or open mesh material can be provided on the inside and/or outside of the pack 200 to removably receive a light assembly 20 through an opening 204. In a similar fashion, virtually any compartment, such as an ice cooler, an article of luggage, a purse, a storage chest and the like can be provided with internal and/or external pockets for receiving one or more light assemblies either on their exterior or interior surface. Of course, no pockets or other holders are necessary when a light assembly 20 is adhered adhesively to such substrates.

A list of potential applications and substrates for the light assemblies 20 includes:

Alert Devices; Steady or Strobe Mode

Aircraft: 1. Used by pilots for backup cockpit light and on the underside of a visor for chart reading. 2. Used in a downed plane for emergency day/night signaling and trail marking.

Automobiles: 1. Compartment light glove box, trunk, engine compartment. 2. Emergency signaling if a vehicle is disabled and as a portable light. 3. Wheel well light to light up rims with chemical luminescent coating.

Aquariums: Light in reefs and tight places.

Babies: 1. Nightlight 2. Crib light 3. Stroller light 4. Educational purposes for teaching colors.

Backpacks: 1. Use as an internal pack light when looking for articles inside a pack in low light. 2. Use as a portable light and as a trail marker, camp marker or day/night emergency signaling system.

Baseball Bats: 1. Use on a bat for training in low light. 2. Dramatic effect in night games.

Barbeque: 1. Grill light 2. Grilling tools

Belts: Fashion use and use as a safety marker.

Bicycles: 1. Use on bike frames and wheels for safety, as well as worn by a rider on a helmet, shoes and apparel. 2. Use as portable lighting and for marking ride routes.

Boating/Marine: 1. Use for increased visibility in small watercraft and personal flotation devices (PFDs) in steady mode or strobe or use as an emergency flashlight or compartment light. 2. Running lights or port, starboard, stern and bow lights. 3. Use on paddles for increased visibility.

Boomerangs: Apply to surface for effect in the dark and easy retrieval.

Boots: 1. Safety markers in clear or reflective pouches on backs of boots, shoes, running shoes, cycling shoes, hunting boots, ski boots and snowboard boots. 2. For visibility with use as an emergency light, trail marker and/or day/night signaling system. 3. Use in luggage tag type pouch attached to boot laces as an emergency light for a day or night signaling system that is always available when worn.

Bowling: Use to mark lanes

Coolers (hard sided, soft sided and insulted lunch bags): 1. Use as an interior light. 2. Use to mark contents with or without light color coding. 3. Use as a marker particularly if a cooler is used as an emergency flotation device.

Camping: 1. Trail markers 2. Tent lights (interior/exterior) 3. Camp perimeter markers 4. Mini flashlight 5. Applied to cooking tools to help locate at night. 6. Applied to hunting boots for night hiking.

Construction: 1. Cones and barriers 2. Hard hats with color coding to identify different workers as personnel. 3. Mark structures with non-conformity to plans by inspectors. 4. Mark hallway areas if no power or light.

Costumes: 1. Halloween costumes for dramatic effect (i.e. spaceman, monster, princess) steady or strobe light keeps children and parents safe at night when walking in streets.

Crime Scenes: 1. Mark crime scene tape 3. Mark specific areas by color 3. Color code personnel at a crime scene.

Diving: 1. Dive gear to mark at night 2. Lines to mark depth 3. Underwater trail markers.

Dogs: 1. Dog pet leashes collars for road safety. 2. Hunting dog collars to mark specific dogs by color code when night hunting. 3. Dog sectors by color code attached to trees.

Dealers: Car, Auto, Boat, Motorcycle trailers

Dueling: Sword fighting; training and dramatic effect in the dark.

Emergency Lighting: Power outages of home lights 2. deck lights 3. Alert lights indicating help is needed 4. Step lights Firearms: 1. Light to check if round in chamber 2. Aid in night sights illumination Firemen: 1. Helmets 2. Mark rooms. 3. Traffic cones Garages: Lights for marking parking spaces Incident Command: 1. Use to mark areas 2. Mark for triage 3. Mark homes for evacuation Kayaking: 1. Use on life jackets and personal flotation devices (PFDs). 2. Use on paddles for night paddling. 3. Use as navigation lights. 4. Use as compartment lights.

Tree Limbing: 1. Mark tree limbs 2. Mark wires near tree limits.

Menu Lights: Operating lights when car, boat, motorcycle and ATV lights fail.

Personnel: Light for different operation for any factory, construction site et.

Power Outages: Use emergency backup lighting.

Quality Control: Applied to production that is defective:

Road Constructions: 1. Use for night cones. 2. Hard hats 3. Safety vests

Street Signs: Use on street signs during power outages/storms.

Uniforms: 1. Public safety 2. Military

As used herein, the term substrate covers all of the articles and applications listed and/or disclosed above as well as other applications requiring safety and/or emergency lighting.

There has been disclosed heretofore the best embodiment of the disclosure presently contemplated. However, it is to be understood that various changes and modifications may be made thereto without departing from the spirit of the disclosure. For example, lighting assemblies 20 can also be coupled to canes, wheelchairs, canoes, and toys.

What is claimed is:

1. A compact layered lighting assembly, comprising:
 a top layer selected from the ground consisting of a shiny light reflecting layer and a nonreflecting black layer;

a shock absorbing resilient layer under said top layer selected from the group consisting of foam material, sponge material and nonwoven fabric material;

a protective layer under said top layer;

a circuit board under said top layer, wherein said circuit board comprises a manually-actuated switch, a switching circuit and a light controlled by said switching circuit, said light directing a beam of light through said top layer; and a plastic pouch surrounding said top layer, said resilient layer, said protective layer and said circuit board and wherein said shock absorbing resilient material is disposed between said top layer and said protective layer and servers as thermal insulation protecting said switching circuit from freezing temperatures.

2. The assembly of claim 1, wherein said top layer comprises a light reflecting foil sheet.

3. The assembly of claim 1, wherein said protective layer comprises a semi-rigid sheet of plastic material.

4. The assembly of claim 1, wherein said protective layer overlies said circuit board.

5. The assembly of claim 1, wherein said top layer comprises a black coating.

6. The assembly of claim 1, wherein said resilient layer comprises a foam material.

7. The assembly of claim 1, further comprising a water resistant coating applied over said circuit board.

8. The assembly of claim 7, wherein said water resistant coating comprises an epoxy coating.

9. The assembly of claim 1, wherein said light comprises a light emitting diode.

10. The assembly of claim 1, wherein said resilient layer has a first aperture formed therethrough and said top layer has a second aperture formed therethrough, and wherein said beam of light is directed through said first first and second apertures.

11. The assembly of claim 10, wherein said light shines through said first and second apertures.

12. The assembly of claim 1, further comprising one or more fasteners extending through and coupling said protective layer and said circuit board.

13. The assembly of claim 1, further comprising a battery connected to said circuit board and selectively electrically connected to said light by said switching circuit and said switch.

14. The assembly of claim 1, further comprising a flexible hinge portion allowing flexing of said assembly adjacent said light.

15. A light and signaling assembly, comprising:

a compact layered light assembly comprising a top layer, a shock absorbing layer, a semi-rigid protective layer, a circuit board including a light, a manually-operated on-off switch and switching circuitry electrically connecting said light and said on-off switch, a water resistant layer covering said switching circuitry;

a flexible hinge portion spaced from said semi-rigid protective layer allowing flexing of said light assembly adjacent said light for protecting said light assembly from breakage due to bending and flexing; and wherein said top layer and said shock absorbing resilient layer are each formed with an aperture allowing for the passage of light from said light therethrough.

16. The lighting and signaling assembly of claim 15, wherein said shock absorbing layer is selected from the group consisting of foam material, sponge material and nonwoven fabric material.

17. A compact layered light assembly, comprising:

a top layer;

a resilient shock absorbing layer bonded to said top layer and selected from the group consisting of foam material, sponge material and nonwoven fabric material;

a battery;

a circuit board layered with said resilient layer, wherein said circuit board comprises a light, switching circuitry and a manual switch selectively connecting said battery to said light via said switching circuitry for switching said light on and off;

a semi-rigid protective layer adjacent said circuit board strengthening and protecting said assembly;

a water resistant coating covering said circuit board;

a waterproof casing surrounding and protecting said top layer, said resilient layer and said circuit board; and an adhesive layer on said casing and a peel-off cover covering said adhesive layer.

* * * * *